US007865746B2

(12) United States Patent
Bozek et al.

(10) Patent No.: US 7,865,746 B2
(45) Date of Patent: Jan. 4, 2011

(54) POWER STATE CONTROL FOR A DESKTOP BLADE IN A BLADE SERVER SYSTEM

(75) Inventors: James J. Bozek, Bothell, WA (US); Makoto Ono, Cary, NC (US); Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 11/697,158

(22) Filed: Apr. 5, 2007

(65) Prior Publication Data

US 2008/0162958 A1 Jul. 3, 2008

Related U.S. Application Data

(63) Continuation-in-part of application No. 11/616,501, filed on Dec. 27, 2006.

(51) Int. Cl.
*G06F 1/00* (2006.01)
(52) U.S. Cl. .................................................. 713/310
(58) Field of Classification Search .................. 713/310
See application file for complete search history.

(56) References Cited

U.S. PATENT DOCUMENTS 7,398,401 B2 * 7/2008 Goud et al. ................. 713/300

| | | | |
|---|---|---|---|
| 2006/0020698 A1 * | 1/2006 | Whipple et al. | 709/224 |
| 2006/0168457 A1 * | 7/2006 | Leech et al. | 713/300 |
| 2006/0203460 A1 * | 9/2006 | Aviv | 361/788 |
| 2007/0055793 A1 * | 3/2007 | Huang et al. | 710/8 |
| 2007/0130481 A1 * | 6/2007 | Takahashi et al. | 713/300 |
| 2008/0028242 A1 * | 1/2008 | Cepulis | 713/320 |

OTHER PUBLICATIONS

Bozek, James J. et al., U.S. Appl. No. 11/616,501, Non-Final Office Action dated Aug. 17, 2009.

* cited by examiner

*Primary Examiner*—Thomas Lee
*Assistant Examiner*—Mohammed H Rehman
(74) *Attorney, Agent, or Firm*—Dillon & Yudell LLP (57) ABSTRACT

A method for controlling the different power states of a ClientBlade™ from a remote desktop environment is described. The remote user's (device) connects his computer device (laptop or desktop) to the ClientBlade™ (at the Blade Center) via a Remote Desktop Protocol (RDP), which performs minimal video compression and provides an Ethernet connection back to the Blade Center. The user inputs a pre-defined key sequence, which initiates a power state interface (or input screen). The power state interface allows the user to select one of several power states. Once the power state is selected, a TCP/IP packet is generated and transmitted from the computer device to the ClientBlade™. The packet invokes the selected power state at the ClientBlade™. Once the power state is activated, a completion message verifying the power state change is sent back to the end user's computer device.

18 Claims, 10 Drawing Sheets

POWER STATE CONTROL FOR A DESKTOP BLADE IN A BLADE SERVER SYSTEM

RELATED APPLICATION & PRIORITY CLAIM

The present invention is a continuation-in-part of U.S. patent application Ser. No. 11/616,501. The invention claims priority of the Dec. 27, 2006 filing date of the related application.

BACKGROUND OF THE INVENTION

1. Technical Field

The present invention generally relates to computer systems and in particular to control of power states in computer systems. Still more particularly, the present invention relates to a method, system, and data processing system configuration that enable control of the power states in a BladeCenter™ environment.

2. Description of the Related Art

The need for more efficient processing systems has lead to the growth of multi-component computer systems. These computer systems often include components such as servers, hard drives, and peripheral devices stored in vertical racks, integrated into a freestanding chassis device. Also, as enterprises grow, requiring more computer power and less space consumption, the need for more streamlined computing resources is apparent. International Business Machines (IBM) Corp. of Armonk, N.Y., has developed the IBM BladeCenter™ and ClientBlades™, which bundles computing systems into a compact operational unit. The IBM eServer BladeCenter™ provides the streamlined computing resources desired by the various enterprises.

The BladeCenter™ is a consolidation of servers into a compact, more manageable environment. The BladeCenter™ chassis provides slots for desktop blades or ClientBlades™ that are composed of a processor, memory, hard disk storage, and firmware. Remote BladeCenters™ support client environments in which the client desktop operating system and all applications run on ClientBlades™. The BladeCenter™ centrally manages all client computers. ClientBlades™ host end-user sessions by providing computing power and storage, while the user performs input and output tasks via interaction with a thin client device.

One drawback to existing implementations of the ClientBlade™ environment is that the ClientBlade™ does not enable a remote user(s) to conveniently manage many of the power state activities of the ClientBlade™. Currently, changing a ClientBlade™ power state to the sleep state is completed by a program, which monitors the time of inactivity of the remote user's operating system. Once the pre-set amount of time of inactivity expires, signals requesting the sleep power state are transmitted to the ClientBlade™, where the power state changes to the sleep state. Remote users may also control power states of a ClientBlade™ from a remote computer if the remote computer utilizes an operating system, such as Windows XP™. The operating system of the remote computer communicates with the operating system of the ClientBlade™ to control the power states of the ClientBlade™. Methods exist that allow an end user to control the on and off power state of the ClientBlade™. However, there is currently no convenient way to access the various other power states (e.g., sleep state and hibernate state). Thus, while the on/off power state changes are supported, there are many disadvantages to the current process when considering the inaccessibility of an end user to controlling the other power states of the ClientBlade™.

Existing server blade and ClientBlade™ power state management operations are useful and provide secure server usage. However, in the remote desktop environment, there is a need for an end user or administrator to be able to remotely control each of the different power states of the ClientBlade™.

SUMMARY OF EMBODIMENTS OF THE INVENTION

Disclosed is a method for enabling a remote user to control the different power states of a ClientBlade™ from a remote desktop environment. An end-user is authenticated and then permitted to control the different power states of the ClientBlade™ from a remote device. In one embodiment, the remote user's (device) connects his computer device (laptop or desktop) to the ClientBlade™ (at the Blade Center) via a Remote Desktop Protocol (RDP), which performs minimal video compression and provides an Ethernet connection back to the Blade Center. The user inputs a key sequence, which initiates a power state interface (or input screen). The power state interface allows the user to select one of several power states. Once the power state is selected, a TCP/IP packet is generated and transmitted from the computer device to the ClientBlade™. The packet invokes the selected power state at the ClientBlade™. Once the power state is activated, a completion message verifying the power state change is sent back to the end user's computer device. The end user is thus provided the ability to place the ClientBlade™ in either the hibernate or sleep state from any location on the network.

In one implementation, end users utilize a serial or network connection to access the power control features of the ClientBlade™ via the device's management module. Access to the management module enables the end-user to have full control of the power states of the ClientBlade™, independent of any operating system. Modified instruction to the basic input/output system (BIOS) transmitted from the management module via the baseboard management controller (BMC) of the ClientBlade™ enables the ClientBlade™ to enter additional power states. Therefore, in addition to control of the on/off power states of the ClientBlade™, an end user may control the sleep and hibernate power states of a ClientBlade™.

In another embodiment of the invention, the end-user desktop environment may utilize an operating system, such as with a thin client system, to manage the power states of the ClientBlade™. A thin client is a network computer without a hard disk drive that only provides video, keyboard, and mouse interface to the ClientBlade™. Thin clients allow all data processing to be performed by the ClientBlade™ from a remote location by an end user. End users may access total power state control of the ClientBlade™ through the thin client operating system. The operating system transmits the power state change instruction to the super input/output (SIO), which notifies the BMC and power controller. The super input/output (SIO) controls the power state hardware and permits the ClientBlade™ power state change to occur.

In another embodiment, a serial over LAN (SOL) connection is utilized to control the sleep and hibernate power states of the ClientBlade™. The SOL connection of the ClientBlade™ transmits data over a local area network (LAN), and may be utilized for remote ClientBlade™ power state control. SOL avoids the use of access cables from serial-connections and allows a remote user to manage the power states of the ClientBlade™ from any remote location with network access through the ClientBlade™ Ethernet interface. Power state signals sent through the Ethernet are transmitted to the baseboard management controller (BMC) of the ClientBlade™, which provides pulsed instruction to the power state hardware regulating the various power states of the ClientBlade™. In addition to the ability of the end user to regulate the on/off power state of the ClientBlade™, the end user may also control the sleep and hibernate power states through the SOL connection.

According to one embodiment, a password authentication is required to permit total or partial control of the ClientBlade power states by an end user. The password is end user dependent and may be implemented in the form of a privilege bit mask, which is utilized to verify access to the power states by the end-user. The privilege bit mask is an instruction in which each bit represents an action that may be set for each entry in an access control list, such as user name, password, and security level. The end user connects to the ClientBlade™ through a serial or network connection and establishes communication with the management module of the ClientBlade™. When requesting a power state change, the end user inputs the power state command followed by the user assigned password. The management module transmits a three bit signal to the BMC instructing the ClientBlade™ to hard power off, shutdown, sleep, hibernate, or power on as permitted by the administered privilege level.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system and computer program product for controlling the different power states of a ClientBlade™ from a remote desktop environment. The ClientBlade™ management module is modified by assigning privileged masks to allow a remote end-user to have total power state control without utilizing an operating system. The remote end-user connects his computer device (e.g., laptop or desktop) to the ClientBlade™ (at the Blade Center) via a Remote Desktop Protocol (RDP), which performs minimal video compression and provides an Ethernet connection back to the Blade Center. The user inputs a key sequence, which initiates a power state interface (or input screen). The power state interface allows the user to select one of several power states. Once the power state is selected, a TCP/IP packet is generated and transmitted from the computer device to the ClientBlade™. The packet invokes the selected power state at the ClientBlade™. Once the power state is activated, a completion message verifying the power state change is sent back to the end user's computer device. The end user is thus provided the ability to place the ClientBlade™ in either the hibernate or sleep state from any location on the network.

In one embodiment, support for the end user's computer device requires a modification to the BIOS. The end-user is enabled to control the power state of the ClientBlade™ from any location within the network. The User Interface Compression Card off-loads the operating system from having to perform any video compression and also supports the RDP protocol.

Several methods for controlling the various ClientBlade™ power states are provided and described herein. In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 2xx for FIG. 2 and 3xx for FIG. 3). The specific numerals assigned to the elements are provided solely to aid in the description and not meant to imply any limitations (structural or functional) on the invention.

It is also understood that the use of specific parameter names are for example only and not meant to imply any limitations on the invention. Embodiments of the invention may thus be implemented with different nomenclature/terminology utilized to describe the above parameters, without limitation.

Within the description of embodiments of the invention, a ClientBlade™ is a subset of an industry-standard server blade that is implemented as a thin, pluggable desktop processor board. The ClientBlade™ slides into a BladeCenter™ chassis, or enclosure, designed specifically to house multiple ClientBlade™ units. Each ClientBlade™ connects to the midplane of the BladeCenter™ chassis, from which the ClientBlade™ shares common resources such as power, cooling, network connectivity, management functions, and access to other shared resources (such as a front-panel, CD-ROM drive, or diskette drive).

Figure 1:
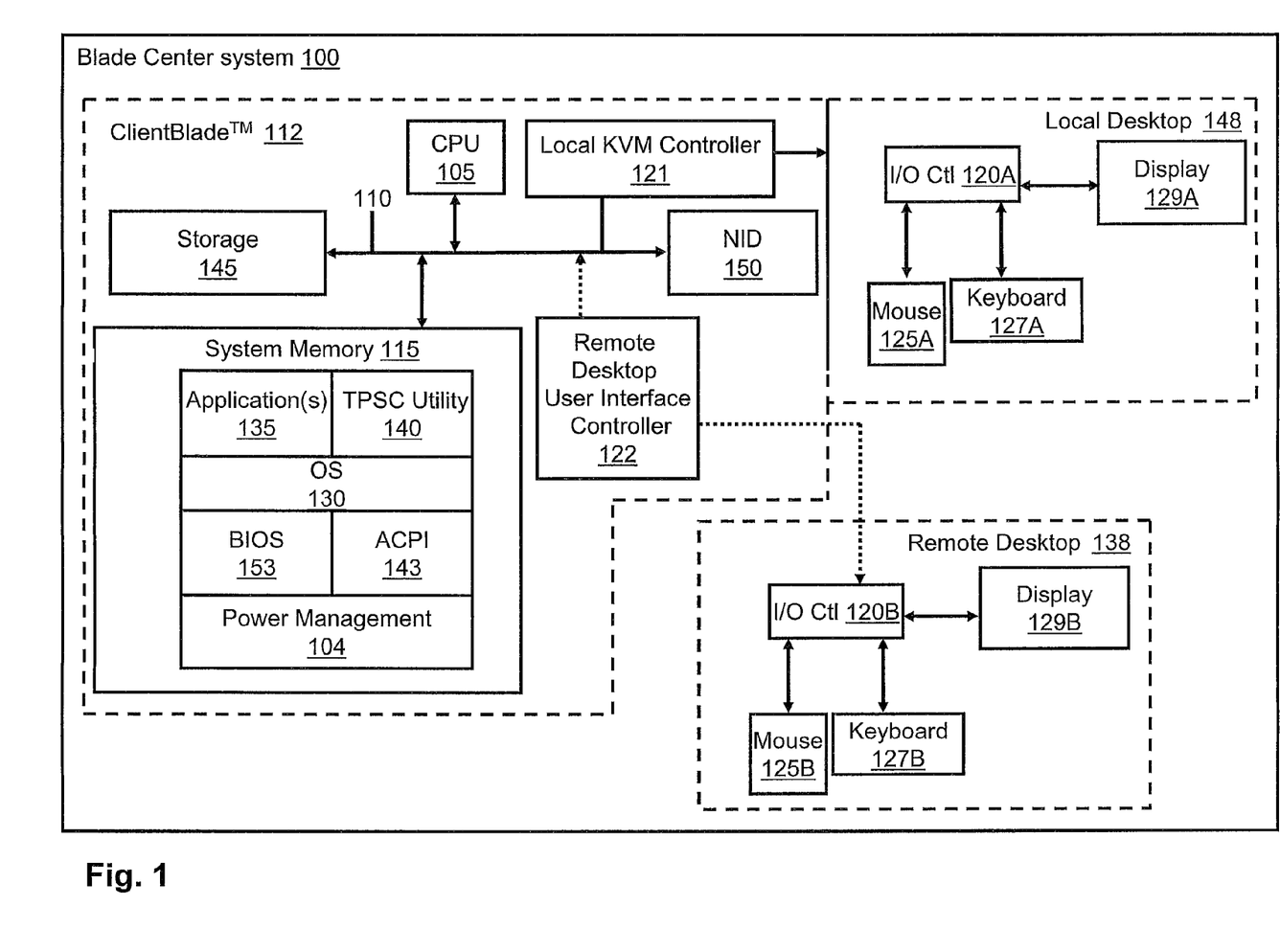
FIG. 1 is a diagram of an example data processing system utilized to implement an illustrative embodiment of the present invention.

With reference now to the figures, FIG. 1 depicts a basic structure of a blade computer system utilized in one embodiment of the invention. In FIG. 1, there is depicted a block diagram representation of a blade computer system within which features of the invention may be advantageously implemented. ClientBlade™ 112 of BladeCenter™ system 100 comprises a central processing unit (CPU) 105 coupled to system memory 115 via a system bus/interconnect 110. Also coupled to system bus 110 is local keyboard/mouse/video transmission controller 121 connected to an input/output (I/O) controller 120A, which controls access to local desktop 148. A Remote Desktop User Interface controller 122 is also connected to remote I/O controller 120B, which controls access to remote desktop 138. The Remote Desktop User Interface controller 122 is independent of the CPU 105.

FIG. 1 also illustrates several input devices that allow access to local desktop 148 and remote desktop 138 of which are mouse 125A and 128B, as well as keyboard 127A and 127B, respectively. I/O controller 120A and 120B also control access to output devices, of which are illustrated as display 129A and 129B, respectively. According to the described embodiments of the invention, an end user is provided the same functional capability remotely by using the connectivity found in the Remote Desktop User Interface controller 122. In another embodiment, the end user is provided the functional capability locally by using the local keyboard/mouse/video transmission controller 121.

In order to support use of removable storage media, I/O Controllers 120A and 120B may further support one or more USB ports (not specifically shown) and/or media disk drive, such as compact disk Read/Write (CDRW)/digital video disk (DVD) drive, for example. ClientBlade™ 112 further comprises network interface device (NID) 150 by which ClientBlade™ 112 is able to connect to and communicate with an external device or network (such as the Internet). NID 150 may be a modem or network adapter and may also be a wireless transceiver device.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software instruction stored within system memory 115 or other storage and executed by processor(s) 105. Among the software instruction are instructions for enabling network connection and communication via NID 150, and more specific to the invention, instruction for enabling the total power state control features described below. As previously stated, an end user has the same functional capability remotely by using the connectivity found in the Remote Desktop User Interface controller 122 and locally by using the local keyboard/mouse/video transmission controller 121. For simplicity, the collective body of instruction that enables the total power state control (TPSC) control features is referred to herein as TPSC utility 140. In actual implementation, TPSC utility 140 may be added to existing operating system (OS) instructions in the presence of an operating system, or as a stand alone application to provide the total power state control functionality described below.

Thus, as shown by FIG. 1, in addition to the above-described hardware components, ClientBlade™ 112 further comprises a number of software (and/or firmware) components, including basic input/output system (BIOS) 153, advanced configuration and power interface (ACPI) 143, operating system (OS) 130 (e.g., Microsoft Windows®, a trademark of Microsoft Corp, or GNU®/Linux®, registered trademarks of the Free Software Foundation and The Linux Mark Institute) and one or more software applications, including TPSC utility 140. BIOS 153 contains instructions required for ClientBlade™ 112 to control the remote and local desktop peripheral devices and power management 104. ACPI 143 establishes industry-standard interfaces and specifies how BIOS 153, OS 130, TPSC 140, and all other peripheral devices communicate with each other regarding power usage.

In implementation, OS 130 and TPSC utility 140 are located within system memory 115 and executed on processor (CPU) 105. According to the illustrative embodiment, when processor 105 executes TPSC utility 140, TPSC utility 140 enables ClientBlade™ 112 to complete a series of functional processes, including: (A) Total power state control by the remote user; (B) Remote power state control via a decompression brick system; and (C) Privileged access total power state control; and other features/functionality described below and illustrated by FIGS. 2-7.

A. Total Power State Control by the Remote User

Figure 3:
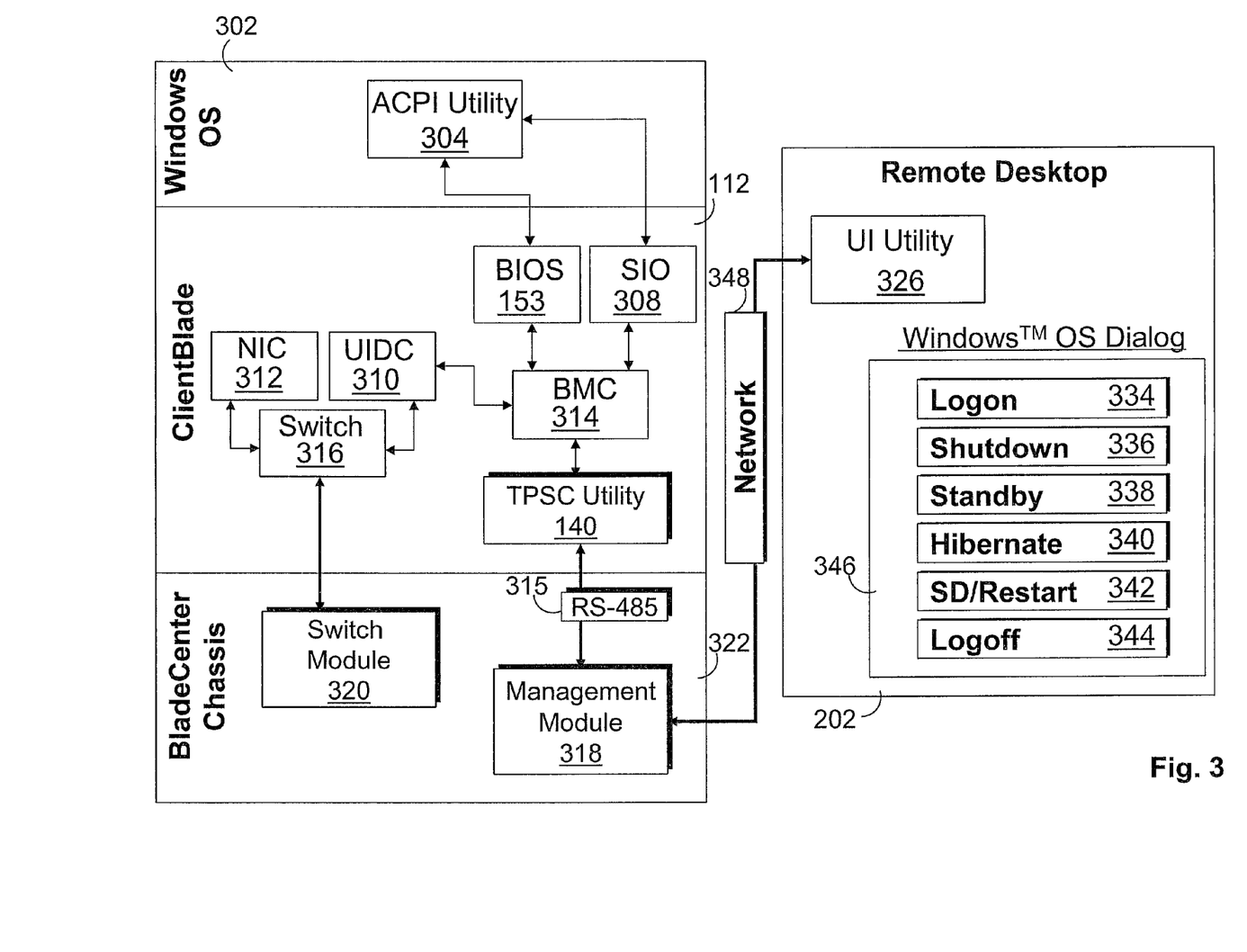
FIG. 3 is a block diagram illustrating power state control from a remote user in accordance with one embodiment of the present invention.

FIG. 3 is a block diagram of the BladeCenter™ System configuration when implementing total power state control by a remote user through a network connection. BladeCenter™ chassis 322 comprises management module 318 and switch module 320. The main task of management module 320 is to manage BladeCenter™ chassis 322, as well as blades (e.g. ClientBlade™ 112), modules, and shared resources. BladeCenter™ chassis 322 also provides functionality that allows a data center management application, such as TPSC utility 140, to be used to manage the BladeCenter system. Management module 320 consists of a processor and switch functions. Management module 320 has an Ethernet point-to-point connection via switch module 320. Switch module 320 provides networking and/or switch functions to ClientBlade™ 112. ClientBlade™ 112 is composed of Super I/O (SIO) 308, User Interface Daughter Card (UIDC) 310, network interface card (NIC) 312, baseboard management controller (BMC) 314, and switch 316. Super I/O 308 and UIDC 310 communicate with BMC 314 during power state change. NIC 312 allows ClientBlade™ 306 to connect to and communicate with an external device or network (e.g. network 348). BMC 314 works in conjunction with management module 320 to manage ClientBlade™ 112. BMC 314 is responsible for power management of ClientBlade™ 112. RS-485 bus 315 provides the communication path between the management module and TPSC utility 140 in ClientBlade™ 112. Switch 316 receives information from switch module 320 and initiates switch functions of ClientBlade™ 112.

Management module 318 receives power state instructions from user interface (UI) utility 326 of remote desktop 202. Remote desktop 202 includes all basic functions of a thin client system including Windows™ Operating System 346, which allows the remote user to control all power states of ClientBlade™ 112. These power states include: logon, shutdown, standby, hibernate, shutdown (SD)/restart, and logoff, all represented by respective functions 334, 336, 338, 340, 342, and 344.

Figure 2:
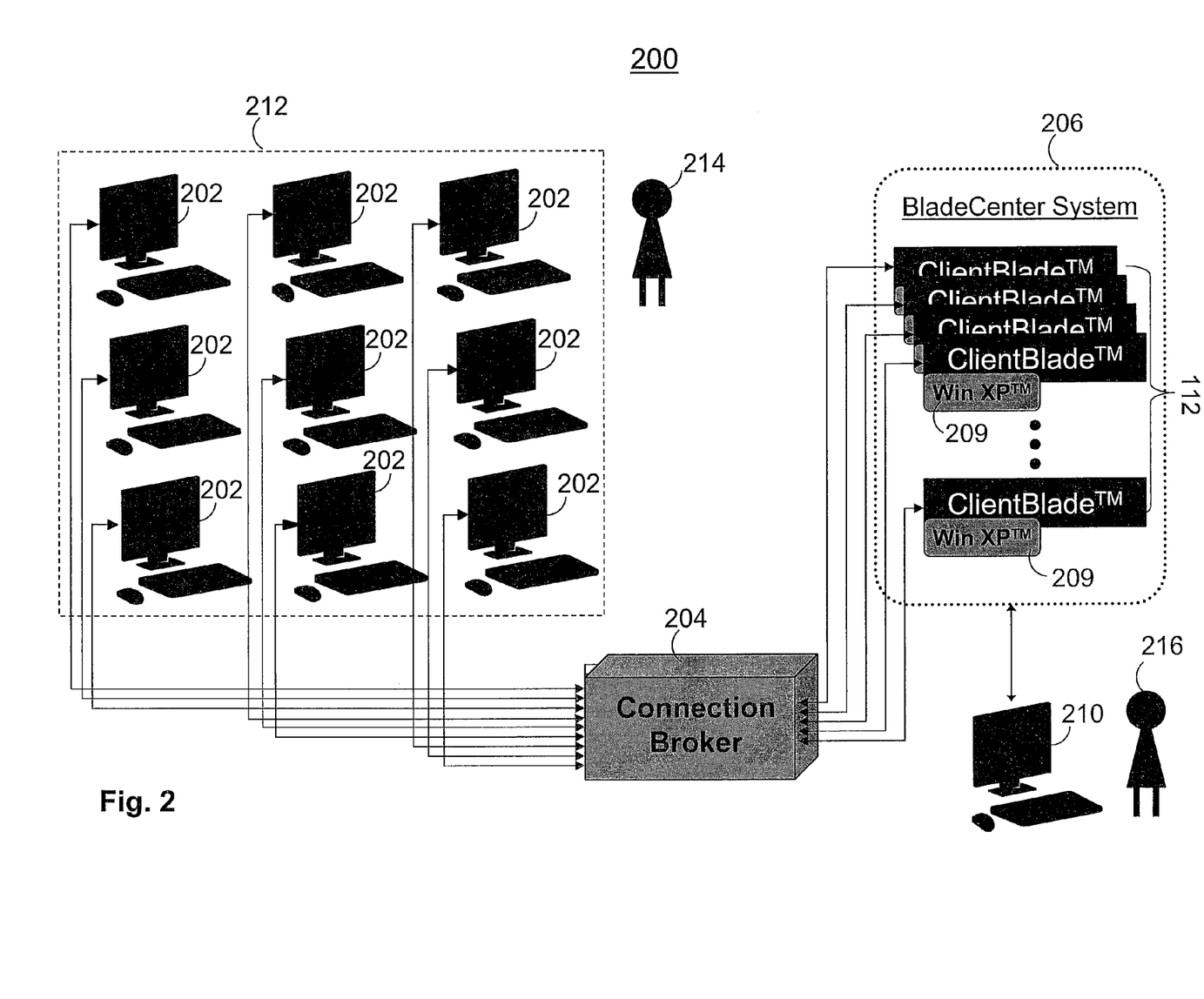
FIG. 2 is a diagram of thin client computers linked to a BladeCenter™ system over a local or remote area network in accordance with an illustrative embodiment of the present invention.

In one embodiment, to accomplish a power state change from remote desktop 202, UI utility 326 sends a series of Transmission Control Protocol/Internet Protocol (TCP/IP) messages, via network 348, to management module 318 initiating power state change. If required, connections may be passed through a connection broker, as shown in FIG. 2, for purposes of user authentication. UIDC 310 receives TCP/IP messages and then sends an interrupt to BMC 314. BMC 314 receives the request for a power state change and performs the action on ClientBlade 112. BladeCenter Chassis 322 is notified of the power state change by management module 318.

In another embodiment, management module 318 receives a remote request to change the power via a serial over LAN connection. Management module 318 sends a power state change command to TPSC utility 140 via RS-485 bus 315, TPSC utility 140 transmits the request for power state change to BMC 314. BMC 314 provides a power on/off pulse of varying lengths to the power management. Pulse lengths are dependent on the requested power state. The pulses are interpreted by the basic input/output system (BIOS) 153 of ClientBlade™ 112. In an example embodiment a pulse of less than one second to the BIOS puts ClientBlade™ 112 in the sleep state. A pulse of greater than one second, but less than four seconds forces ClientBlade™ 112 into hibernate state. If a hard power off is required, there is no communication with the BIOS. To initiate a hard power off, management module 318 sends a command to the BMC 314 to cut bulk power to ClientBlade 306, while maintaining standby power to BMC 314.

B. Remote Power State Control Via a Decompression Brick System

In the described embodiments, the remote user has full control of the power states of ClientBlade™ 112. The power states of ClientBlade 112 are shutdown, standby, hibernate, restart, and hard power off. To experience the remote desktop session, thin client 138 may enter each of the various power states from an operating system or a remote computer device without an operating system. When the remote user device does not have an operating system, the remote user is provided a decompression brick. The decompression brick provides the video, keyboard, and mouse interface to ClientBlade™ 112. Independent of ClientBlade™ 112 operating system, the remote user logs onto the remote decompression hardware and initiates power state changes independent of the state of ClientBlade™ 112 operating system. In addition, the information technology (IT) administrator retains the ability to place ClientBlade™ 112 in hibernate state via local thin client (210 of FIG. 2, described below) for removal and porting to a different BladeCenter™ 100.

FIG. 2 comprises a diagram of a desktop system linked to a BladeCenter™ system over an area network. Network 200 comprises BladeCenter™ system 206, which is composed of approximately 14 blades (ClientBlade™ 112) that share a pool of local desktops 148. Administrator 216 may manage BladeCenter™ system 206 from local desktop 210. Local desktop 210 comprises a keyboard and mouse, and controls the power states of ClientBlade™ 112 via BladeCenter™ system 206. Local desktop 210 may also consist of a Universal Serial Bus (USB) CD-ROM/DVD (compact disk, read-only memory/digital video disk) drive and USB floppy disk drive. ClientBlade™ 112 may include a Windows XP operating system 209. Each ClientBlade™ 112 in BladeCenter™ system 206 is connected to (at least) one remote desktop 202 through connection broker 204. Connection broker 204 provides the administrative operational interface to computer network 212. Connection broker 204 designates each ClientBlade™ 112 to provide remote access to by the appropriate remote desktop 202, and then connection broker 204 has virtually no connection to remote desktop 202 or ClientBlade™ 112 during the ClientBlade™ session with the remote desktop 202.

In one embodiment of the invention, the remote user 214 at remote desktop 202 may utilize an operating system, such as with a thin client system, to manage the power states of ClientBlade™ 112. A thin client is a network computer with an operating system but without a hard disk drive, and which only provides video, keyboard, and mouse interface to ClientBlade™ 112. Thin clients allow all data processing to be performed by ClientBlade™ 112 in computer network 212 by remote user 214. Remote user 214 may access total power state control of ClientBlade™ 112 through the thin client operating system. The operating system transmits the power state change instruction to super I/O 308 (FIG. 3), which notifies BMC 314. Super I/O 308 controls the power state hardware and permits power state to change to occur at ClientBlade™ 112.

In an alternative embodiment of the invention, remote desktop 202 of computer network 212 does not require an operating system to manage the power states of the ClientBlade™. Remote desktop 202 may be a decompression brick providing keyboard, mouse, and USB input from the end user and which contains hardware for decompressing video and audio transmitted from the ClientBlade™ 112 to the end user. With this embodiment, all data processing is performed by ClientBlade™ 112, and remote user 214 may access ClientBlade™ 112 through connection broker 204. Remote user 214 logs on to the connection broker, which verifies the identity of the remote user and determines which ClientBlade™ 112 remote user 214 may access. Connection broker 204 transmits the address of the ClientBlade™ 112 that remote user 214 may connect to.

In the alternative embodiment, remote desktop access to management module 318 (FIG. 3) of ClientBlade™ 112 enables remote user 214 to have full control of the power states of ClientBlade™ 112 independent of any operating system. From remote desktop 202, power state instruction is transmitted from management module 318 to BMC 314 (FIG. 3) to BIOS 153 of ClientBlade™ 112, enabling ClientBlade™ 112 to enter additional power states. Therefore, in addition to control of the on/off power states of the ClientBlade™, remote user 214 of a decompression brick may control the sleep and hibernate power states of ClientBlade™ 112.

C. Privilege Access Total Power State Control

In one embodiment, to restrict power state control to particular users, a user password and level of security access may be assigned. To protect power state change at power on of ClientBlade™, the management module transmits a privilege bit mask that is utilized to verify access to the power states by remote user. The privilege bit mask is instruction in which each bit represents an action that may be set for each entry in an access control list, such as user name, password, and security level. The IT administration determines the contents of this access control list. The IT administrator connects to ClientBlade™ through a serial or network connection and establishes communication with the management module of the ClientBlade™ to communicate this information to the ClientBlade™. In one embodiment, the management module transmits a three bit signal to the BMC instructing the Client- Blade™ of the actions that can be invoked by the end user. When requesting a power state change, the end user inputs the power state command followed by the user assigned password. These actions include hard power off, shutdown, sleep, hibernate, or power on as permitted by the administered privilege level of the access control list. Once this action is verified in the ClientBlade™, the appropriate action is taken.

FIG. 4A is an illustration of an administrator interface for assigning security access to a ClientBlade™. Administrator interface 400 provides privileged access to each power state of the ClientBlade™ according to assigned level of security. The administrator enters user name 402, user password 404, and assigns level of security 406 for each user that is permitted to change/access one or more of the power states. In this example embodiment, level of security 406 ranges from zero security level (least privilege) to ten security level (maximum privilege). Assigned user name, password, and level of security are saved to the management module by selecting save option 408, and then the administrator exits the program by selecting exit option 410.

Figure 4:
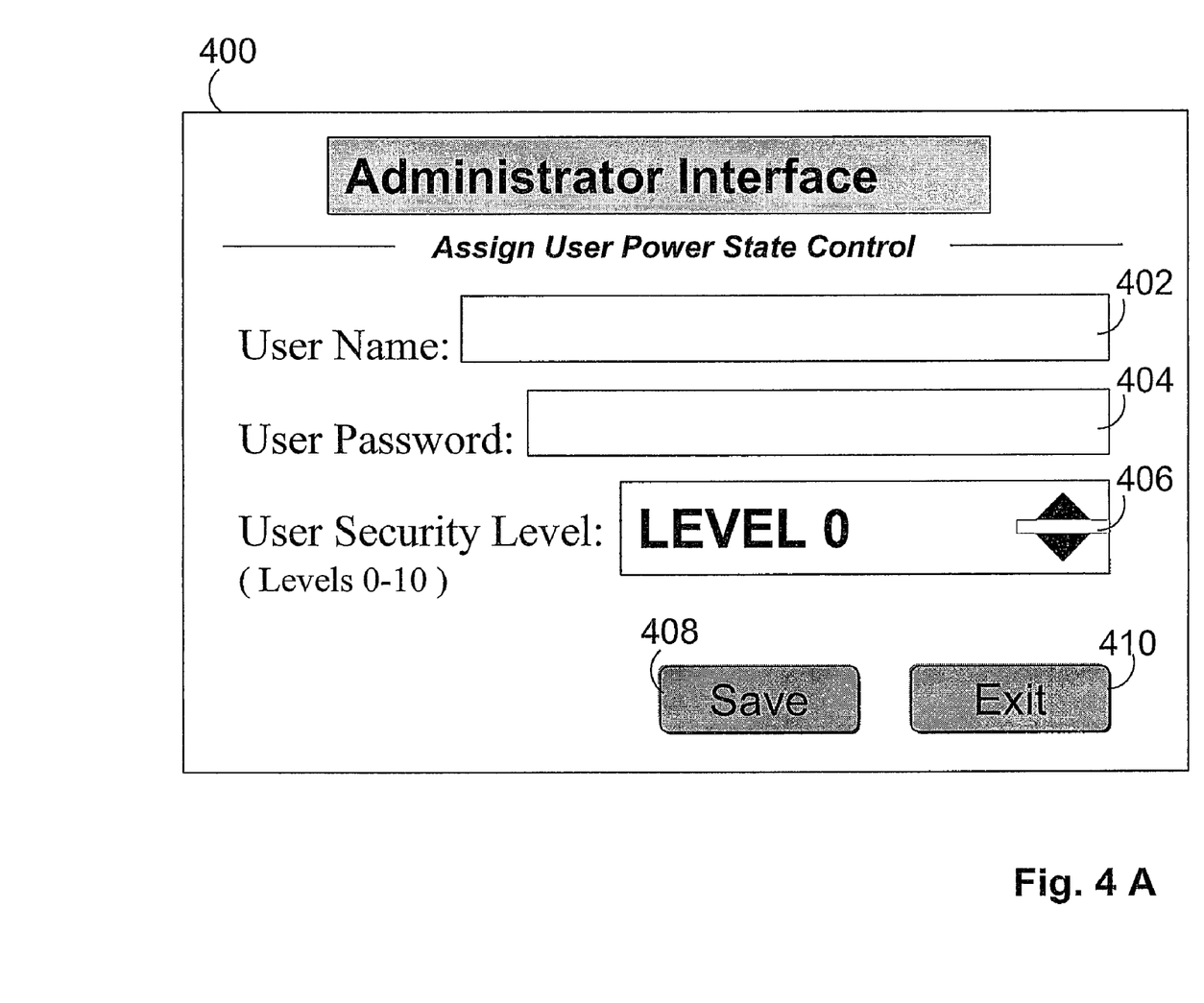
FIG. 4A is an illustrative embodiment of ClientBlade™ administrator graphical user interface.
FIG. 4B is an illustrative embodiment of ClientBlade™ power state control graphical user interface.
Figure 4B:
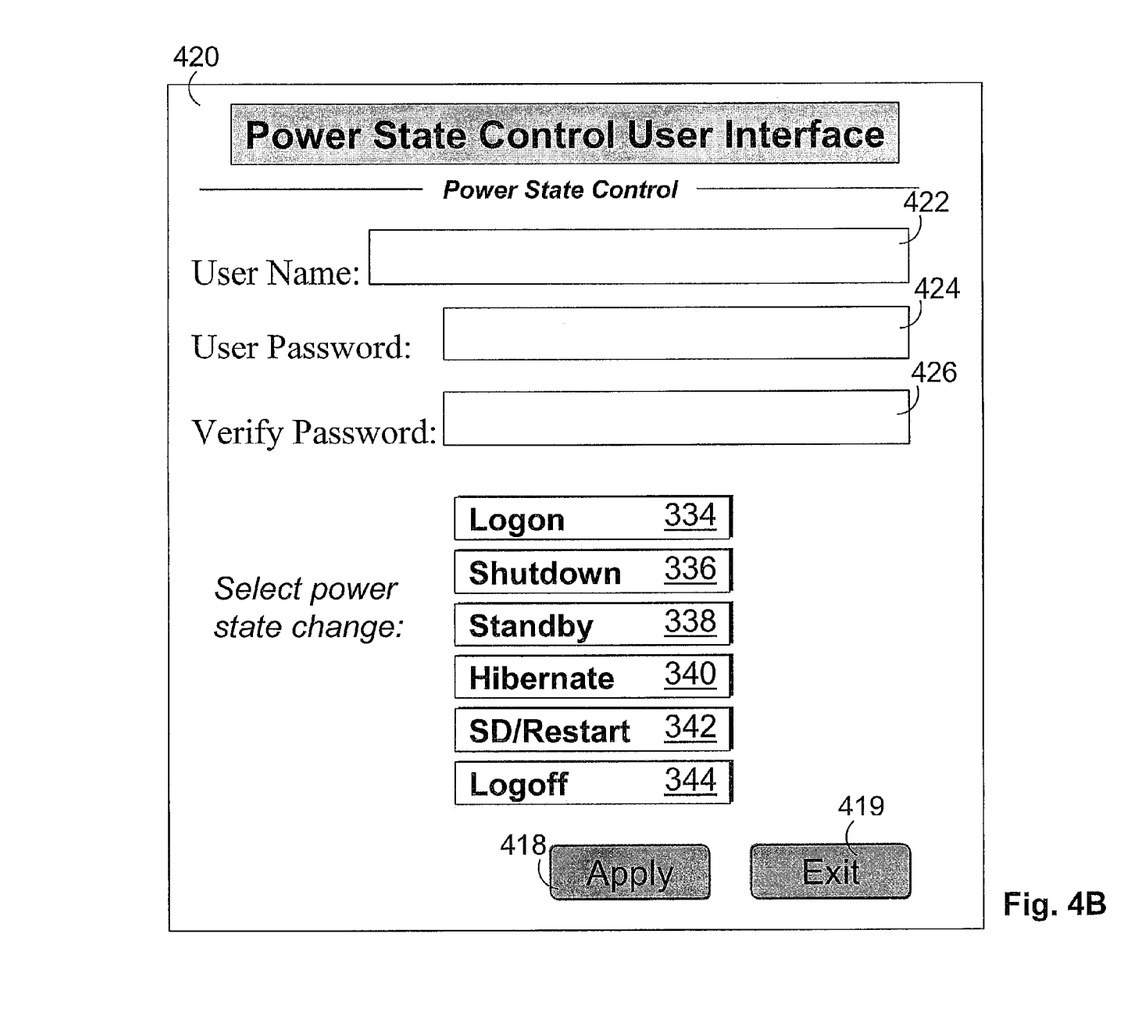

FIG. 4B is an illustration of a user interface to change the power state of a ClientBlade™. User interface 420 allows end user access to ClientBlade™ power state controls, the user must enter user name 422, user password 424, and the user must verify the entered password at dialog box verify password 426. The user then initiates a request to change the power state by selecting "apply" option 418. Alternatively, the user may simply close the user interface 420 by selecting exit option 419 Once the user has been authenticated (i.e., the correct combination of password and user name entered), the end user may activate a change to the power states based on the power state selected within user interface 420. According to the illustrative embodiment, example power states available for selection by the user within user interface 420 includes the following power states: logon 334, shutdown 336, standby 338, hibernate 340, shutdown (SD)/Restart 342, and logoff 344. Additional power states may also be programmed and remotely activated.

Figure 5:
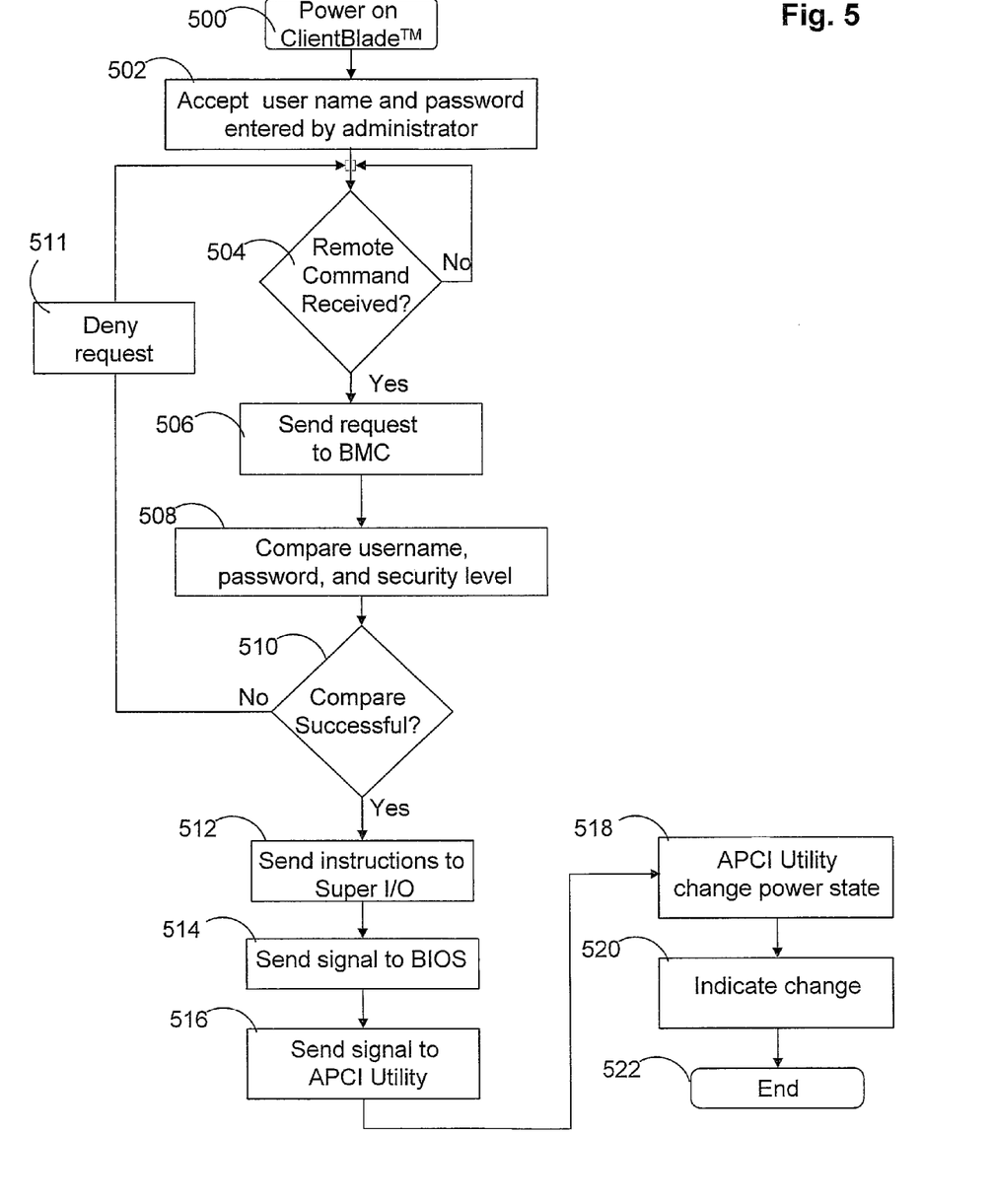
FIG. 5 is a logic flow chart illustrating implementation of end user power state control utilizing a privilege bit mask in accordance with one embodiment of the invention.

The flow chart of FIG. 5 depicts the process of implementing power state control of a ClientBlade™ via a remote desktop with an operating system and an administered security access. The process begins at step 500, at which the ClientBlade™ is powered on by the BladeCenter™ management module (management module 318 of FIG. 3). TPSC utility 140 (FIG. 1) accepts the user name and password entered by the remote user or administrator in step 502. A determination is made at step 504 whether the remote power state command received by the TPSC utility at step 504 is for the standby state or sleep state. If no remote command is received by the TPSC utility at step 504, the TPSC utility waits for a remote power state command. If the remote power state command received is not standby or hibernate, the TPSC utility sends the power state change request to the BMC (314 of FIG. 3), at step 511. If the remote power state command is "standby" or "hibernate", the BMC compares the user name and password of the remote user to the entries of administered user name, password and security level, as shown at step 508.

If the user name, password, and security level of the remote user successfully compares with the administered user name, password, and security level of the administrator, as determined at step 510, the TPSC utility accepts the power state change request and transmits the request to the BMC at step 511. The TPSC utility then sends the instructions to the Super I/O (308 of FIG. 3) function at step 512. If the user name, password, and security level does not compare successfully at step 510, the TPSC utility denies the request at step 511, and the process returns to step 504 and awaits remote command from a registered remote user. At step 514, the Super I/O transmits the instructions (or signal) to the BIOS (154 of FIG. 1). The BIOS then sends the signal to the advanced configuration and power interface (APCI) utility (304 of FIG. 3) at step 516. The APCI utility provides power management interfaces between the system BIOS and the operating system. At step 518, the APCI utility changes the power state of the ClientBlade™. The TPSC utility then indicates the power state change on the local or remote thin client indicator function, as depicted at step 520. After the power state change has completed (or has been indicated), the process ends at step 522.

Figure 6:
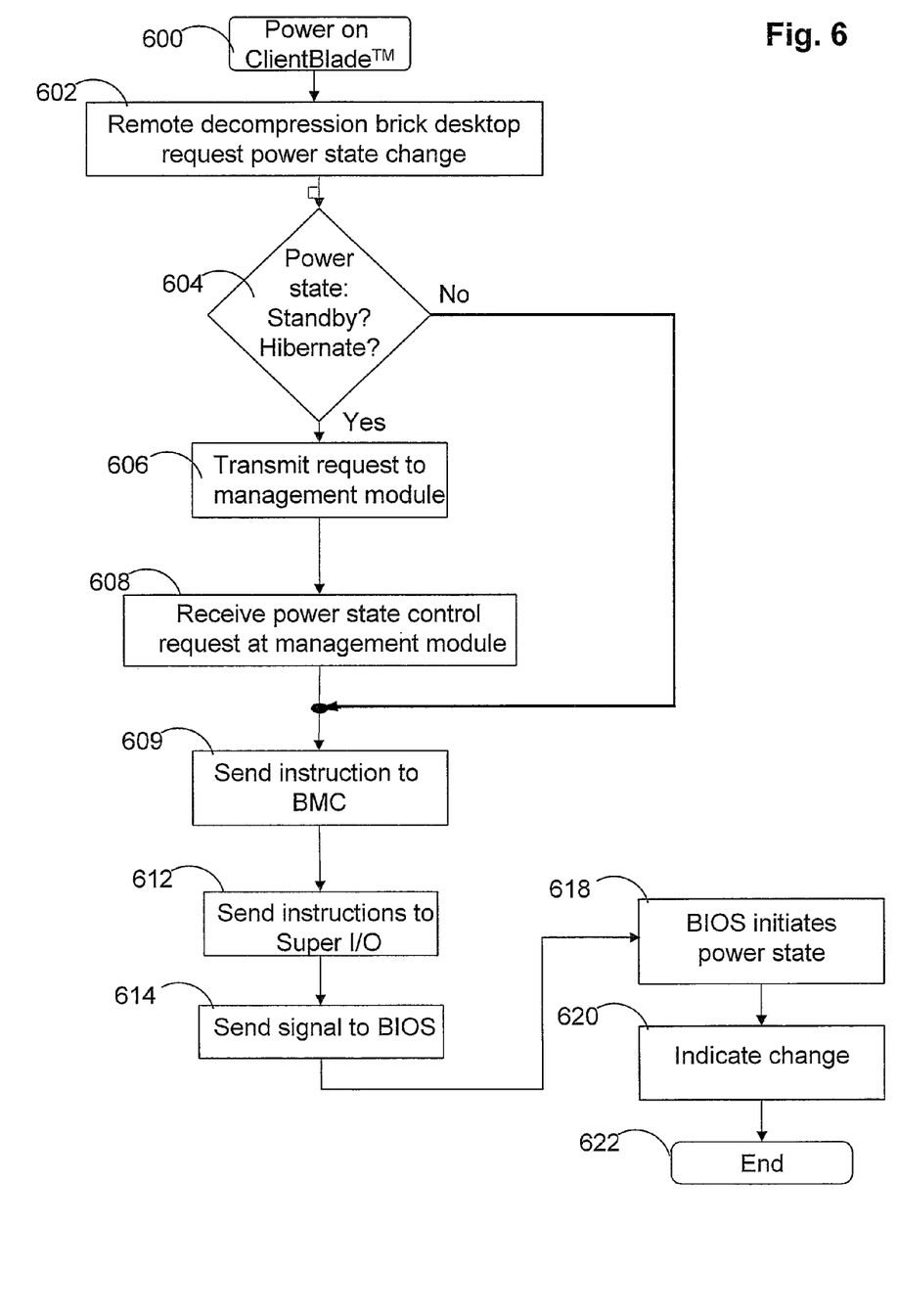
FIG. 6 is a logic flow chart illustrating implementation of end user power state control utilizing a decompression brick system in accordance with one embodiment of the invention.

The flow chart of FIG. 6 depicts the process of implementing power state control of a ClientBlade™ via a decompression brick system. The process begins at step 600, during which the ClientBlade™ is powered on by the BladeCenter™ management module (management module 318 of FIG. 3). Remoter user 214 requests a power state change from a decompression brick desktop system. As in steps 502 through 511 of FIG. 5, described above, the user name and password must be authenticated by the ClientBlade™ or management module. Once the authentication is complete, a determination is made at step 604, whether a remote power state command of standby or hibernate is received by the TPSC utility. If the remote command is not standby or hibernate, the TPSC utility sends the requested command to the BMC (314 of FIG. 3) at step 609. If a remote power state command of standby or hibernate is received, the TPSC utility sends the power state change request to the management module (318 of FIG. 3), at step 606, and the power state request is received at the management module at step 608. The power state change request is then transmitted from the management module to the BMC. The management module provides the Ethernet connection from the BladeCenter to a remote management network, such as computer network 200 of FIG. 2.

Once the power state change request is received at the BMC, the BMC transmits pulsed instructions to the Super I/O (308 of FIG. 3) function at step 612. At step 614, the Super I/O transmits the signal to the BIOS (154 of FIG. 1). The BIOS interprets the pulse widths of the signals and initiates the changes to the power state of the ClientBlade™, at step 618. The TPSC utility indicates the power state change on the local or remote thin client output device, at step 620. After the power state change has been indicated, the process ends at step 622.

Figure 7:
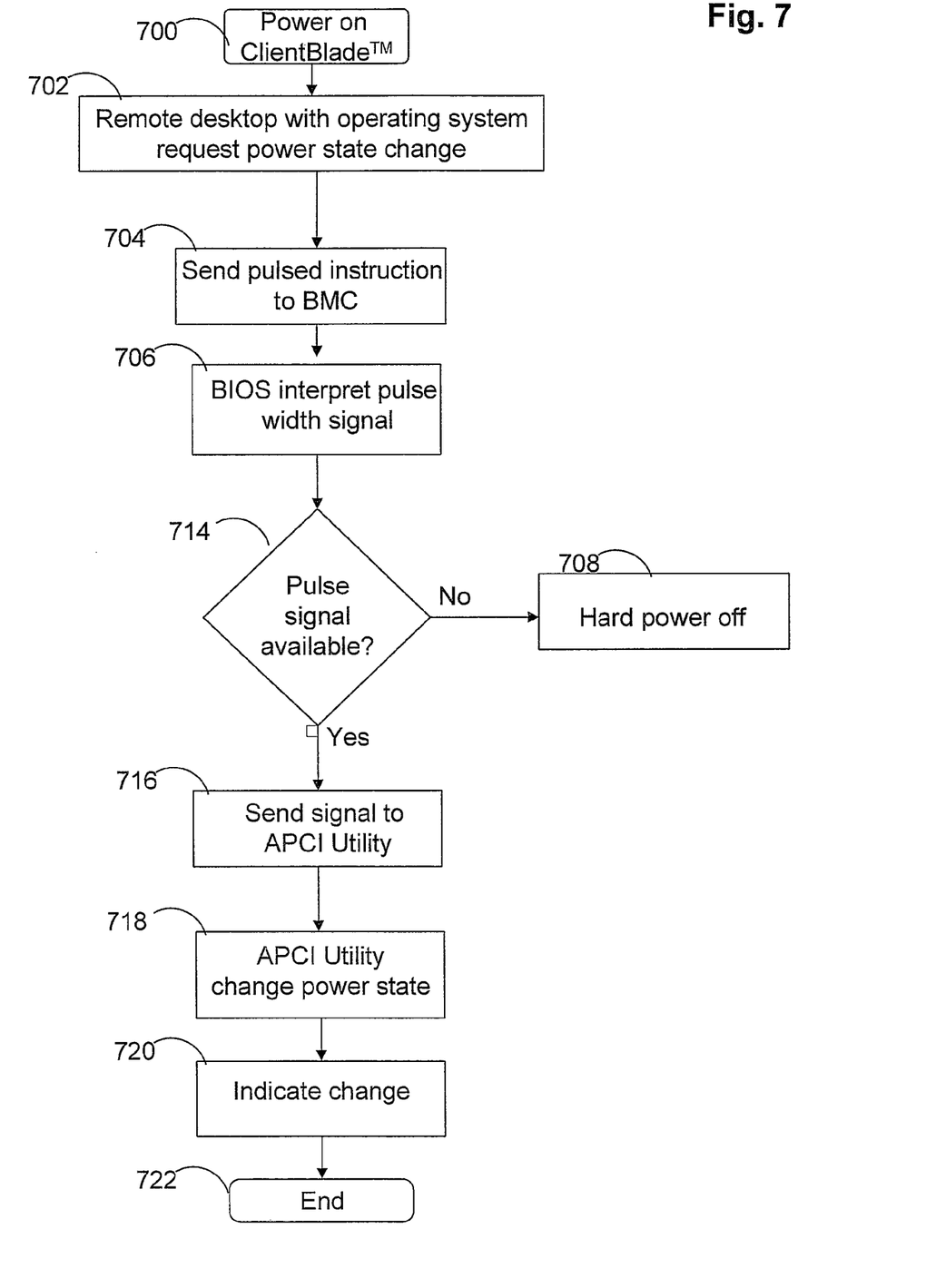
FIG. 7 is a logic flow chart illustrating implementation of end user power state control utilizing a desktop with an operating system in accordance with one embodiment of the invention.

The flow chart of FIG. 7 depicts the process of implementing power state control of a ClientBlade™ via a remote desktop with an operating system. The process begins at step 700, at which the ClientBlade™ is powered on by the BladeCenter™ management module (management module 318 of FIG. 3). Remote user 214 requests power state changes from a desktop with an operating system. As in steps 502 through 511 of FIG. 5, described above, the user name and password are first authenticated by the ClientBlade™ or management module. After the authentication is complete, at step 704, the pulsed instructions of the power state change are transmitted to the BMC. A determination is made at step 714 whether the remote power state command is hard power off. If the request is hard power off, then the ClientBlade is hard powered off at step 508. If the request is not hard power off, pulsed signals are generated by the BMC, at step 712. The pulsed signal generated at step 712 is transmitted to the BIOS. The BIOS interprets the pulse widths of the signals at step 714. The BIOS then transmits the power state change command (signal) to the advanced configuration and power interface (APCI) utility (304 of FIG. 3) at step 716. At step 718, the APCI utility changes the power state of the ClientBlade™.

The APCI utility provides power management interfaces between the system BIOS and the operating system. The TPSC utility indicates the power state change on the local or remote thin client indicator mechanism at step 720. After the power state change has been indicated, the process ends at step 722.

In one embodiment, a generalized network environment is supported, in which a user (or end user) is able to take his computer device (e.g., a laptop computer) to any point in the network, connect to/access the information at the Client-Blade™ (a remote desktop blade located at the Blade Center), and control the power states of the ClientBlade™. According to the illustrated embodiment of FIG. 8, the end user connects his computer device (laptop) 802 to one or more Client-Blade™ 112 located at Blade Center 806. The Blade Center connection to network 812 is via Ethernet switch 801. Also, as shown by the illustrative embodiment, the connection may be accomplished/supported by a Remote Desktop Protocol (RDP). According to the embodiment, the RDP protocol is a standardized software offering that performs minimal video compression and provides an Ethernet connection back to the ClientBlade™ 112.

Figure 8:
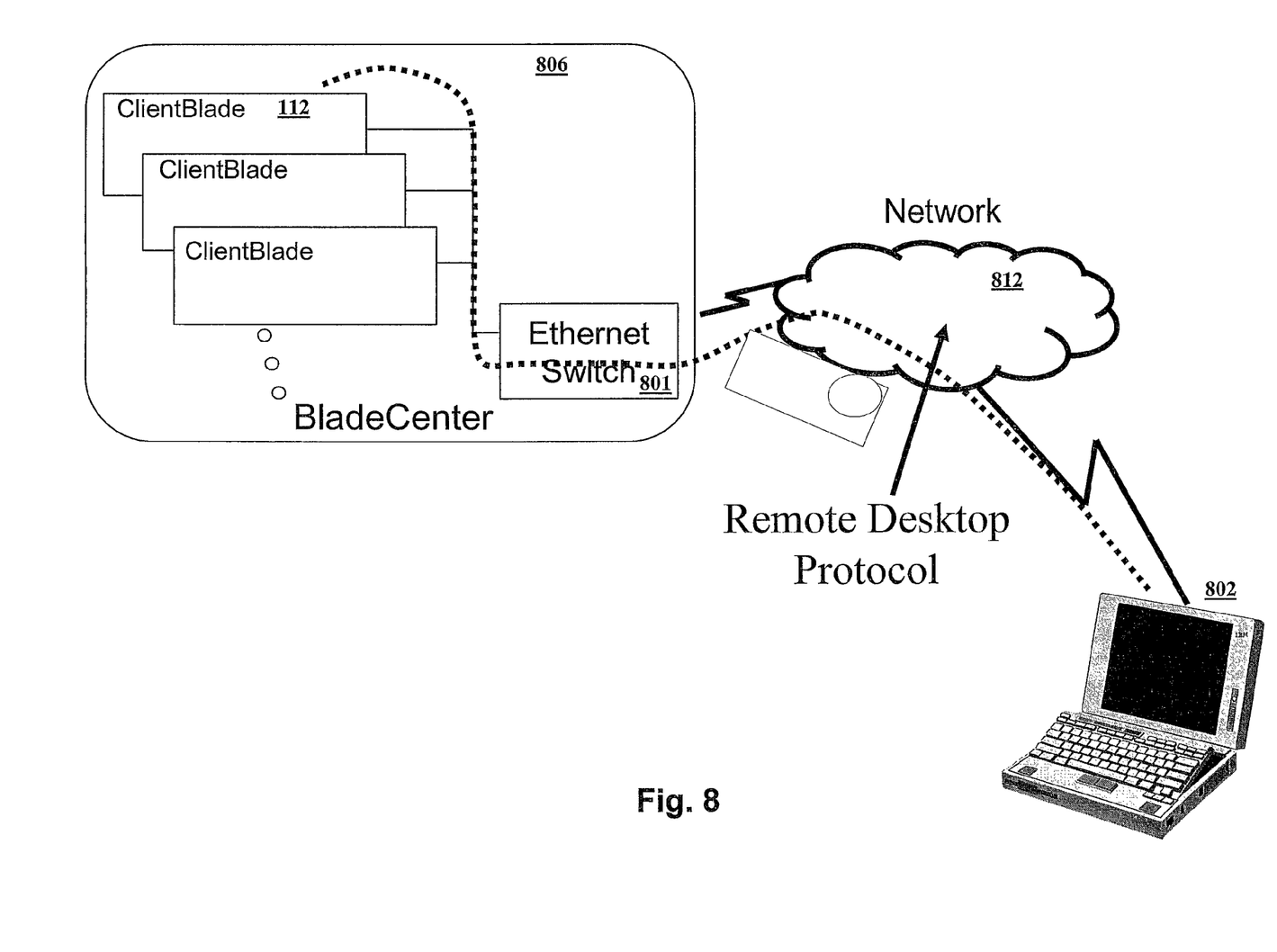
FIG. 8 is a basic network diagram illustrating the network connection via Remote Desktop Protocol (RDP) between an end-user's computer device and the ClientBlade™ in accordance with one embodiment of the invention.

With the connection via RDP, the end-user is able to provide power state control of the ClientBlade™ from the location of the end user's computer device 802 within the network. In one implementation, the end user is provided additional functionality, which increases the flexibility of the networking environment by giving the end user the ability to place the remote desktop blade in other power states, such as the hibernate and sleep states.

The configuration of ClientBlade™ 112 remains similar to the previously described configurations. The User Interface Compression Card off-loads the operating system from having to perform any video compression. Also, in addition to supporting current video compression algorithms, the User Interface Compression Card supports the RDP protocol. The RDP protocol is independent from the operating system of the ClientBlade™ 112 and, as such, the RDP protocol does not impact any processor performance.

With the present embodiment, a modification is provided to the BIOS of the computer device 802. The modification is independent from the operating system and does not impact the end user's performance. This modification allows the BIOS to detect the pre-defined power state control key sequence entered by the user on the laptop keyboard. Once this key sequence is invoked, a message is displayed (e.g., within a selection window) to give the user the option to choose the power state desired.

Figure 9:
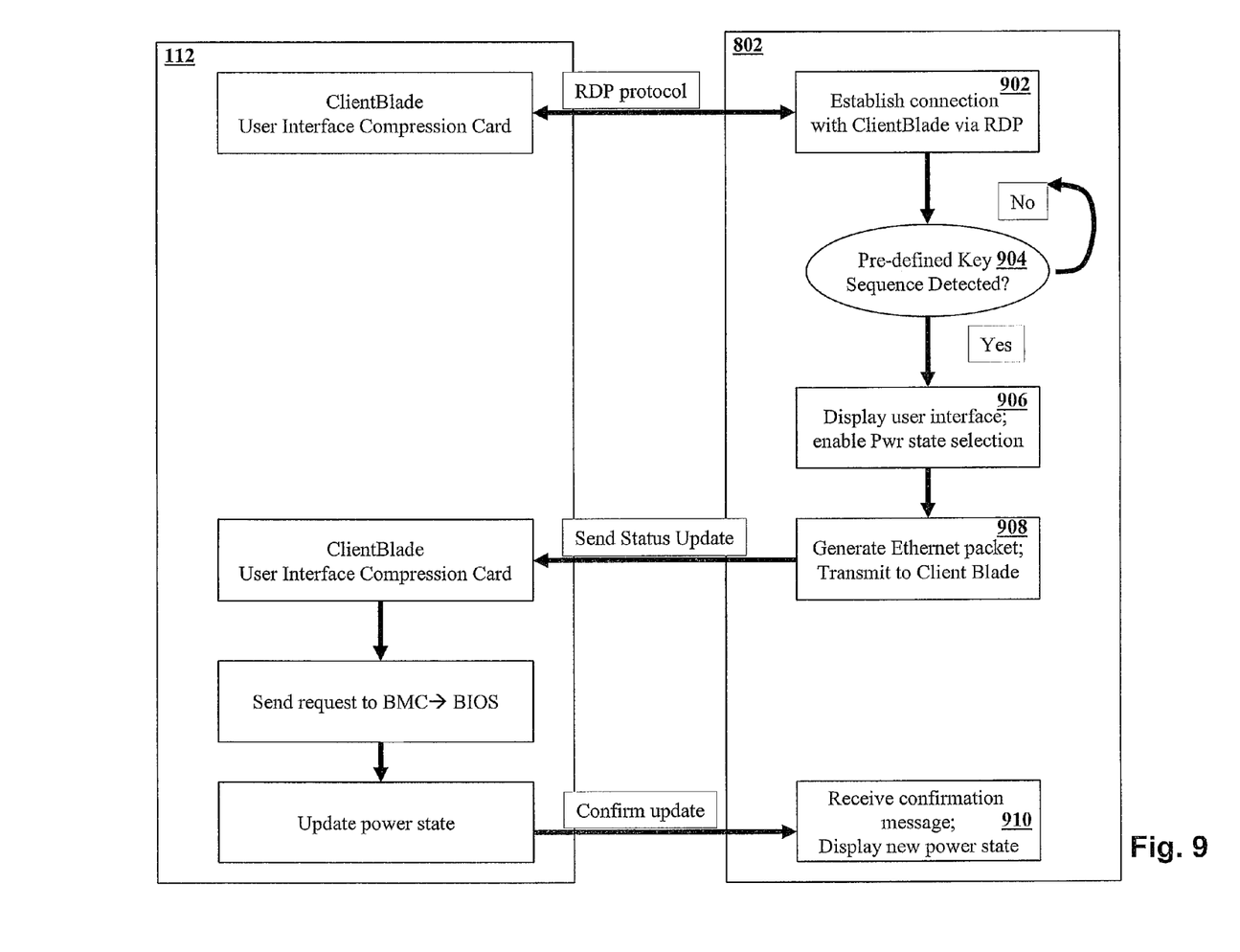
FIG. 9 is a logic flow chart illustrating implementation of end user power state control utilizing a computer device connected via RDP to a ClientBlade™, according to one embodiment of the invention.

FIG. 9 is a flow chart illustrating the method by which the present embodiment is completed from the end user perspective. FIG. 9 also illustrates the connection of processes to components within the ClientBlade™. The process begins at block 902, which describes the end user connecting the end user's computer device to the ClientBlade™ using RDP over an Ethernet network connection to the Blade Center. At some point during the session with the ClientBlade™, the user inputs a pre-defined key sequence, such as CTRL-ALT-SHIFT-P, for example, to invoke the power state control. When the pre-defined key sequence is detected at decision block 904, a remote power control (RPC) utility is activated and the PPC utility provides a user interface with user selections for power state inputs, as shown at block 906. The user interface may be a rudimentary power state input screen or more specialized graphical user interface (GUI), as shown in FIG. 4B. The user interface enables the end user to select the power state desired for the ClientBlade™. The user thus selects from among sleep, hibernate, soft-shutdown, hard power off, and other available/supported power states.

Once the user selection is complete and registered by the utility, the utility generates a corresponding TCP/IP packet, which is transmitted from the user's computer device to the ClientBlade™ via the established network connection, as shown at block 908. The message encoded within the TCP/IP packet invokes the proper power state at the ClientBlade™, which then transmits a verification message back to the end user's computer device to confirm the power state change. Thus, the computer device receives the verification message and the utility displays the new power state of the Client-Blade™, as shown at block 910.

The state operations at the ClientBlade™ are represented at the left of the above described flow chart, with directional arrows indicating the flow of information between the user's computer device and the Client B. According to the illustrated embodiment, RDP is utilized to establish a session between the end user's computer device and the User Interface Compression card of the ClientBlade™. When the user selection is made in the user interface of the computer device, the resulting power state data is formulated into an Ethernet packet and sent to/received by the User Interface Compression Card. The User Interface Compression Card in turn sends a message to the baseboard management controller (BMC) and then to BIOS. The BIOS triggers entry into the new power state, and a message is generated and sent to the end user's computer device confirming the change in power state of the Client-Blade™.

While the new power state is entered, the connection between the ClientBlade™ and the end user's computer device is maintained. Then, to reestablish the RDP session, a special key sequence is entered at the user's computer device. The special key sequence enables the user to power-on the ClientBlade™ from the previous power state. Implementation of the above described embodiment provides a more generic application of features of the invention without requiring a special stand-alone brick.

In the flow charts above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for enabling remote power state control of a computer device, said method comprising:
receiving a pre-defined input to activate a power state control utility;
providing a user interface with options for selection of one or more power states including a sleep state and a hibernate state of a client blade located at a remote blade center;
enabling selection of the sleep state and the hibernate state only when a privilege level associated with an authenticated user is a first privilege level, wherein when the privilege level is not the first privilege level, only a power on and power off power states are supported for the authenticated user;
encapsulating within a network packet a selected power state from among the one or more power states; and
transmitting the network packet to the computer device via a network connection, wherein receipt of the network packet at the computer device triggers a change in power state of the computer device to the selected power state encapsulated within the network packet;
wherein when the computer device is the client blade and the power state encapsulated within the network packet is one of the sleep state and the hibernate state, a receipt of the network packet at the client blade triggers the client blade to enter into a respective one of the sleep state and the hibernate state from a remote device.

2. The method of claim 1, further comprising:
receiving a confirmation message from the computer device; and
generating an output of a current power state of the computer device.

3. The method of claim 1, wherein the client blade comprises a User Interface Compression Card and the Blade Center comprises an Ethernet switch for connecting to the network, said method further comprising:
establishing a connection with the client blade via Remote Desktop Protocol (RDP) over the network; and
maintaining the connection with the client blade following a change in power state of the client blade.

4. The method of claim 1, further comprising:
providing a list of selectable power states from among a sleep state, a hibernate state, a standby state, power-off state, and a power-on state; and
generating a network packet encapsulating data corresponding to the specific one of the selectable power states that is the selected power state.

5. The method of claim 1, further comprising:
receiving user authentication input to activate the power state control utility;
determining a privilege level of the received user authentication input after the authentication is confirmed; and
when the sleep state or hibernate state is selected and the privilege level is the first privilege level, said encapsulating encapsulates a selected one of the sleep state or the hibernate state.

6. The method of claim 5, further comprising:
receiving a password as a component of the user authentication input, wherein the password is implemented in the form of a privilege bit mask;
verifying, via the privilege bit mask, a level of access to the power states by the authenticated user; and
enabling the level of access to modify the power state of the client blade based on the privilege bit mask.

7. A computer program product comprising:
a computer readable storage medium; and
program instructions on the computer readable storage medium that when executed within a blade-server system enables remote power state control of a network-connected computer device, said program instruction comprising program instructions for:
receiving a pre-defined input to activate a power state control utility;
providing a user interface with options for selection of one or more power states including a sleep state and a hibernate state of a client blade located at a remote blade center;
enabling selection of sleep state and the hibernate state only when the privilege level associated with an authenticated user is a first privilege level, wherein when the privilege level is not the first privilege level, only a power on and power off power states are supported for the authenticated user;
encapsulating a selected power state from among the one or more power states in a network packet; and
transmitting the network packet to the computer device via a network connection, wherein receipt of the network packet at the computer device triggers a change in power state of the computer device to the selected power state encapsulated within the network packet;
wherein when the computer device is the client blade and the power state encapsulated within the network packet is one of the sleep state and the hibernate state, a receipt of the network packet at the client blade triggers the client blade to enter into a respective one of the sleep state and the hibernate state from a remote device.

8. The computer program product of claim 7, further comprising program instructions for:
receiving a confirmation message from the computer device; and
generating an output of a current power state of the computer device.

9. The computer program product of claim 7, wherein the client blade comprises a User Interface Compression Card and the Blade Center comprises an Ethernet switch for connecting to the network, said program instructions further comprising instructions for:
establishing a connection with the client blade via Remote Desktop Protocol (RDP) over the network; and
maintaining the connection with the client blade following a change in power state of the client blade.

10. The computer program product of claim 7, further comprising program instructions for:
providing a list of selectable power states from among a sleep state, a hibernate state, a standby state, power-off state, and a power-on state; and
generating a network packet encapsulating data corresponding to the specific one of the selectable power states that is the selected power state.

11. The computer program product of claim 7, further comprising program instructions for:
receiving user authentication input to activate the power state control utility;
determining a privilege level of the received user authentication input after the authentication is confirmed; and
when the sleep state or hibernate state is selected and the privilege level is the first privilege level, said encapsulating encapsulates a selected one of the sleep state or the hibernate state.

12. The computer program product of claim 11, further comprising program instructions for:
- receiving a password as a component of the user authentication input, wherein the password is implemented in the form of a privilege bit mask;
- verifying, via the privilege bit mask, a level of access to the power states by the authenticated user; and
- enabling the level of access to modify the power state of the client blade based on the privilege bit mask.

13. A system for enabling remote power state control of a network-connected computer device, said system comprising:
- a computer device including:
  - a processor and memory;
  - a utility providing program instructions that when executed on the processor performs the functions of:
    - receiving a pre-defined input to activate a power state control utility;
    - providing a user interface with options for selection of one or more power states including a sleep state and a hibernate state of a client blade located at a remote blade center;
    - enabling selection of sleep state and the hibernate state only when the privilege level associated with an authenticated user is a first privilege level, wherein when the privilege level is not the first privilege level, only a power on and power off power states are supported for the authenticated user;
    - encapsulating a selected power state from among the one or more power states in a network packet; and
    - transmitting the network packet to the computer device via a network connection, wherein receipt of the network packet at the computer device triggers a change in power state of the computer device to the selected power state encapsulated within the network packet;
  - wherein when the computer device is the client blade and the power state encapsulated within the network packet is one of the sleep state and the hibernate state, a receipt of the network packet at the client blade triggers the client blade to enter into a respective one of the sleep state and the hibernate state from a remote device.

14. The system of claim 13, wherein said utility further comprises program instructions for:
- receiving a confirmation message from the computer device; and
- generating an output of a current power state of the computer device.

15. The system of claim 13, wherein the client blade comprises a User Interface Compression Card and the Blade Center comprises an Ethernet switch for connecting to the network, said utility further comprising instructions for:
- establishing a connection with the client blade via Remote Desktop Protocol (RDP) over the network; and
- maintaining the connection with the client blade following a change in power state of the client blade.

16. The system of claim 13, said utility further comprising program instructions for:
- providing a list of selectable power states from among a sleep state, a hibernate state, a standby state, power-off state, and a power-on state; and
- generating a network packet encapsulating data corresponding to the specific one of the selectable power states that is the selected power state.

17. The system of claim 13, said utility further comprising instructions for:
- receiving user authentication input to activate the power state control utility;
- determining a privilege level of the received user authentication input after the authentication is confirmed; and
- when the sleep state or hibernate state is selected and the privilege level is the first privilege level, said encapsulating encapsulates a selected one of the sleep state or the hibernate state.

18. The system of claim 17, said utility further comprising instructions for:
- receiving a password as a component of the user authentication input, wherein the password is implemented in the form of a privilege bit mask;
- verifying, via the privilege bit mask, a level of access to the power states by the authenticated user; and
- enabling the level of access to modify the power state of the client blade based on the privilege bit mask.

* * * * *